US012697594B2

(12) United States Patent
Clarkson et al.

(10) Patent No.: US 12,697,594 B2
(45) Date of Patent: Aug. 4, 2026

(54) OR RELATING TO CATALYST CARRIERS FOR TUBULAR REACTORS AND ASSOCIATED METHODS

(71) Applicant: JOHNSON MATTHEY DAVY TECHNOLOGIES LIMITED, London (GB)

(72) Inventors: Jay Simon Clarkson, Stockton-on-Tees (GB); Henry Arthur Claxton, London (GB); Benjamin Geoffrey Mallam, Stockton-on-Tees (GB)

(73) Assignee: Johnson Matthey Davy Technologies Limited, London (GB)

( * ) Notice: Subject to any disclaimer, the term of this patent is extended or adjusted under 35 U.S.C. 154(b) by 699 days.

(21) Appl. No.: 18/041,483

(22) PCT Filed: Sep. 24, 2021

(86) PCT No.: PCT/GB2021/052491
§ 371 (c)(1),
(2) Date: Feb. 13, 2023

(87) PCT Pub. No.: WO2022/064212
PCT Pub. Date: Mar. 31, 2022

(65) Prior Publication Data
US 2023/0294058 A1 Sep. 21, 2023

(30) Foreign Application Priority Data
Sep. 25, 2020 (GB) ...................................... 2015186

(51) Int. Cl.
*B01J 8/06* (2006.01)

(52) U.S. Cl.
CPC ........ *B01J 8/06* (2013.01); *B01J 2208/00814* (2013.01)

(58) Field of Classification Search
CPC ... B01J 8/06; B01J 8/0469; B01J 8/008; B01J 19/0073; B01J 2208/008
See application file for complete search history.

(56) References Cited

U.S. PATENT DOCUMENTS

| | | | |
|---|---|---|---|
| 11,413,599 B2 | 8/2022 | Yoshida et al. | |
| 2005/0142049 A1* | 6/2005 | Amsden ................... | B01J 8/003 422/600 |
| 2014/0046077 A1 | 2/2014 | Tilley | |
| 2015/0209755 A1 | 7/2015 | Whittenberger et al. | |

(Continued)

FOREIGN PATENT DOCUMENTS

| | | |
|---|---|---|
| CL | 2023000711 A1 | 10/2023 |
| CL | 2023000725 A1 | 10/2023 |

(Continued)

*Primary Examiner* — Lessanework Seifu
(74) *Attorney, Agent, or Firm* — BakerHostetler

(57) ABSTRACT

A catalyst carrier for insertion into a reactor tube of a tubular reactor comprises a container for holding catalyst and a seal for sealing between the container and the reactor tube. The seal comprises at least a first seal layer and a second seal layer each comprising a plurality of deflectable tongues separated by notches. The second seal layer is rotationally offset relative to the first seal layer such that the notches of the second seal layer are aligned with the deflectable tongues of the first seal layer.

23 Claims, 5 Drawing Sheets

(56)     References Cited

U.S. PATENT DOCUMENTS

| | | | |
|---|---|---|---|
| 2017/0232415 A1* | 8/2017 | Gray | B01J 8/0214 |
| | | | 423/659 |
| 2023/0264160 A1 | 8/2023 | Claxton et al. | |
| 2023/0271151 A1 | 8/2023 | Clarkson et al. | |
| 2023/0285917 A1 | 9/2023 | Baker et al. | |
| 2023/0294056 A1 | 9/2023 | Clarkson et al. | |

FOREIGN PATENT DOCUMENTS

| | | |
|---|---|---|
| CL | 2023000749 | 10/2023 |
| CL | 2023000746 A1 | 11/2023 |
| JP | 2006-223971 A | 8/2006 |
| JP | 2020-11170 A | 1/2020 |
| WO | 2011/048361 A1 | 4/2011 |
| WO | 2012/136971 A1 | 10/2012 |
| WO | 2012146903 A1 | 11/2012 |
| WO | 2016/050520 A1 | 4/2016 |

* cited by examiner

OR RELATING TO CATALYST CARRIERS FOR TUBULAR REACTORS AND ASSOCIATED METHODS

The present disclosure relates to improvements in or relating to catalyst carriers for tubular reactors and associated methods. In particular, the present disclosure relates to a sealing components of a catalyst carrier inserted into a reactor tube of a tubular reactor.

BACKGROUND

Conventional, so-called fixed-bed tubular, reactors comprise a reactor shell containing a plurality of tubes, which are usually cylindrical, and which are usually directly filled with catalyst particles. In use, a heat-transfer medium flows through the shell of the reactor outside these tubes and thereby adjusts the temperature of the catalyst in the tubes by heat exchange across the tube wall. Thus, where the reaction is an exothermic reaction, the heat-transfer medium will allow heat to be removed from the catalyst and where the reaction is an endothermic reaction, the heat-transfer medium will provide heat to the catalyst.

For some reactions, the heat effects of the reaction are moderate such that they are either not problematic or they can be readily managed. In some cases, the heat effects are sufficiently small that large-diameter tubes may be used. This has the benefit that there is a large volume of catalyst within the tube.

However, for more exothermic or endothermic reactions it is necessary that there is efficient heat transfer via the tube wall to the heat transfer medium to enable the conditions within the reactor to be controlled, in order to maintain a stable operating temperature to avoid detrimental effects occurring. Such effects, for exothermic reactions, may include side reactions taking place, damage to the catalyst such as by sintering of the catalytic active sites, and, in a worst case, thermal runaway. Detrimental effects for endothermic reactions may include quenching of the reaction.

To achieve the desired efficiency, the surface area of the tube wall per unit length has to be maximised. This has in the past been achieved by installing a greater number of smaller-diameter tubes. In some reactions, the size restriction means that the tubes are only of the order of about 15 to 40 mm internal diameter. However, the use of this multiplicity of tubes increases the cost and complexity of the reactor.

Thus, in an attempt to mitigate these problems, an alternative approach has been developed, in particular for more exothermic or endothermic reactions, in which the catalyst is not directly packed into the reactor tubes but is instead contained in a plurality of catalyst carriers that are configured to sit within the reactor tube.

A first type of such a catalyst carrier is described in WO2011/048361. This arrangement seeks to optimise heat transfer at the tube wall such that larger tubes and larger volumes of smaller catalyst particles can be used, even for more exothermic or endothermic reactions. The catalyst carrier described in WO2011/048361 comprises an annular container for holding catalyst in use. The container has a perforated inner wall defining a tube, a perforated outer wall, a top surface closing the annular container and a bottom surface closing the annular container. The surface closing the bottom of the tube is formed by the inner wall of the annular container. A skirt extends upwards from the perforated outer wall of the annular container from a position at or near the bottom surface of the container to a position below the location of a seal. A seal is located at or near the top surface and extends from the container by a distance which extends beyond an outer surface of the skirt.

A second type of such a catalyst carrier is described in WO2012/136971. In this arrangement, the catalyst carrier comprises a container for holding a monolith catalyst in use, said container having a bottom surface closing the container and a skirt extending upwardly from the bottom surface of said container to a position below the location of a seal and spaced therefrom, said skirt being positioned such that there is a space between an outer surface of the monolith catalyst and the skirt; and a seal located at or near a top surface of the monolith catalyst and extending from the monolith catalyst by a distance which extends beyond an outer surface of the skirt.

A third type of such a catalyst carrier is described in WO2016/050520. In this arrangement, the catalyst carrier comprises a container for holding catalyst in use. The container has a bottom surface closing the container and a top surface. A carrier outer wall extends from the bottom surface to the top surface and a seal extends from the container by a distance which extends radially beyond the carrier outer wall. The carrier outer wall has apertures located below the seal.

The seal of such catalyst carriers performs an important function in use. The seal must ensure that liquid and gas flow within the reactor core follows a desired path. In particular, the seal must ensure that reactants do not bypass the catalyst contained within the container by passing between an outside of the container and the inner surface of the reactor tube.

It is important that the seal is not subjected to buckling when the catalyst carrier is inserted into the reactor tube, since buckling may open up a gap between the seal and the inner surface of the reactor tube forming a bypass channel for liquid and gas. Furthermore, in order to deform the seal during installation, a large and unpredictable force may be required, which can make loading a tube difficult.

It is an object of the invention to provide a seal for a catalyst carrier that overcomes the problems on the previous designs.

SUMMARY OF THE DISCLOSURE

In a first aspect of the present disclosure there is provided a catalyst carrier for insertion into a reactor tube of a tubular reactor, the catalyst carrier comprising a container for holding catalyst in use and a seal for sealing between the container and an inner surface of the reactor tube;

the catalyst carrier having a longitudinal axis that in use can be aligned with a longitudinal axis of the reactor tube to facilitate installation of the catalyst carrier into the reactor tube;

wherein the seal comprises at least a first seal layer and a second seal layer;

the first seal layer and the second seal layer each comprising a plurality of deflectable tongues separated by notches;

the second seal layer being rotationally offset about the longitudinal axis of the catalyst carrier relative to the first seal layer such that the notches of the second seal layer are aligned with the deflectable tongues of the first seal layer.

Thus, a deflectable tongue of one seal layer may be used to close off and at least partially seal a notch in another seal layer.

Advantageously, the seal of the present disclosure may be particularly well-adapted for forming a seal with the inner surface of the reactor tube. The deflectable tongues provide a means for the seal to adapt to changes in the overall inner diameter of the reactor tube and in variations in the shape of the inner surface.

The notches allow the seal to deform without buckling.

In addition, the use of at least two seal layers permits each seal layer to be made thinner and therefore more flexible compared to a single layer of equivalent thickness. The use of such seal layers also improves the closure between each seal layer and the tube wall.

The use of at least two seal layers may provide an effective means of preventing liquid and gas bypass through the notches.

The seal functions to primarily prevent or reduce bypass of material around the catalyst carrier. In practice, the seal does not need to be prevent all bypassing. The level of bypass that may be tolerated will depend on the application and the number of catalyst carriers present per tube. The bypass of material around the catalyst carrier is preferably below 10% by volume, more preferably below 5% by volume, more preferably below 2% by volume.

The seal also may function to provide a resistive force against the inside wall of the tube. The resistive force is desirably such that the catalyst carrier containing catalyst stays in place within the tube without additional support. A self-supporting catalyst carrier may be advantageous in some uses.

The seal also may function to centre the catalyst carrier within the tube such that the space around the periphery of the catalyst carrier and the inside wall if the tube in which it is placed is uniform. The centring assists in the heat transfer and the efficient flow of materials through the tube.

The first seal layer and the second seal layer may overlie each other. Optionally, the first and second seal layers may be in face-to-face contact on the carrier prior to installation. While an axial clearance may be provided between each seal layer prior to insertion, it is preferable that upon installation within the reactor tube the seal layers are in face-to-face contact (or at least substantially so) in order to minimise bypass.

The first seal layer and the second seal layer may comprise separate sealing elements. Alternatively, the first seal layer and the second seal layer may comprise first and second portions of an integral sealing element. Optionally the integral sealing element may be a helical element.

Each of the first seal layer and the second seal layer may comprise a notched outer edge forming its plurality of deflectable tongues. For example, each seal layer may be formed from a single piece of sheet material. The notched outer edge may be formed by a suitable means such as cutting, stamping, etc. If desired, additional steps may be performed on the seal to remove burrs or change the properties of the seal material after the shape has been formed to alter its resilience.

The notches may comprise side walls that are parallel or diverge towards an outer edge of the respective seal layer. The notches may be U-shaped or V-shaped. The shape of the notch may be varied to make it easier to manufacture. For example, a U-shape may be used that is adapted for a stamping process. The notch shape in adjacent seals may be the same or different. Beneficially, providing an initial spacing between the side walls of a notch may permit the notch to close up at least partially without buckling when the seal layer is deformed by the reactor tube wall.

The first seal layer and the second seal layer may extend perpendicularly from the container. Alternatively, at least a distal end of the tongues of the first seal layer and the second seal layer may be angled towards an end of the container.

Such an arrangement may improve the ease of insertion of the catalyst carrier into the reactor tube.

The first seal layer and the second seal layer may comprise an annular element. The annular element may match the shape of the inner surface of the reactor tube. The annular element may be circular.

In some embodiments, the catalyst carrier may comprise three or more seal layers each comprising a plurality of deflectable tongues separated by notches; each seal layer may be rotationally offset about the longitudinal axis of the catalyst carrier relative to at least one of the other seal layers such that the notches of each seal layer may be aligned with the deflectable tongues of at least one of the other seal layers. Optionally, the notches of each seal layer may be aligned with the deflectable tongues of one or both adjacent seal layers.

In some embodiments the catalyst carrier may comprise four, five or six seal layers.

In some embodiments, the seal layers may be individually attached to the catalyst carrier In some embodiments, an inner edge of the one or more seal layers may be attached together. The attachment may be created before or after the seal layers are attached to the container.

Each seal layer may comprise a key or keyway for engaging a complementary keyway or key on the container for maintaining relative rotational alignment of the seal layers with each other. Beneficially this may help to ensure a correct alignment of the deflectable tongues and notches of different seal layers.

Each container may comprise a bottom surface at the lower end, a top surface at the upper end, and a carrier outer wall extending between the bottom surface to the top surface. The seal layers may be attached to the carrier outer wall and or the top surface.

The carrier outer wall may comprise a plurality of apertures and the seal layers may be attached to the carrier wall above the plurality of apertures.

Each container may further comprise an annular chamber for holding catalyst in use, said annular chamber may have a perforated inner chamber wall defining an inner channel, a perforated outer chamber wall, a top surface closing the annular chamber and a bottom surface closing the annular chamber.

The thickness of the first seal layer and the second seal layer may be the same or may be different. Different thicknesses may be used to configure different seal layers with different characteristics, including, for example, flexibility, stiffness, compressibility, etc. In some embodiments the thickness of each seal layer is from 15 micron to 500 microns (0.015 mm to 0.5 mm). The seal layers may have the same thickness or different thicknesses. For example, a thicker lower/outer seal providing insertion resistance and robustness during handling, and a thinner second upper/inner seal layer providing flexibility to seal against the first layer.

The material of the first seal layer and the second seal layer may be the same or may be different. Preferably the seal layers are formed from a material(s) that is non-reactive to the intended reaction of the tubular reactor. For example, the material may be carbon steel, aluminium, stainless steel, other alloys or any material able to withstand the reaction conditions.

In a second aspect of the present disclosure there is provided a method of installing a catalyst carrier into a reactor tube of a tubular reactor, the method comprising the steps of:

i) providing an installation tool comprising a movable ram configured for pushing the catalyst carrier into the reactor tube;

ii) using the movable ram to push the catalyst carrier into the reactor tube such that a container of the catalyst carrier is received within the reactor tube; and iii) pushing the catalyst carrier into the reactor tube causes a seal of the catalyst carrier to contact and be deformed by an inner surface of the reactor tube and at least a first seal layer and a second seal layer of the seal are deformed by the contact of the seal with the inner surface.

The first seal layer and the second seal layer may both comprise a plurality of notches and pushing the catalyst carrier into the reactor tube may cause the notches to at least partially close.

The first seal layer and the second seal layer may both comprise a plurality of deflectable tongues separated by notches and pushing the catalyst carrier into the reactor tube may cause the plurality of deflectable tongues of one of the first seal layer and the second seal layer to at least partially seal off the notches of the other of the first seal layer and the second seal layer.

The seal may provide a resistance force to insertion up to 100N depending on the weight and strength of the catalyst carrier. The minimum resistance force may be equal to the weight of the catalyst carrier containing catalyst. In some embodiments, the resistance force may be greater than 0.5 N and less than 70 N, preferably greater than 15 N and less than 50 N.

The seals may be fixed to the catalyst carrier or releasably attached to the catalyst carrier. Releasably attached seals may be advantageous should the seals become damaged or deformed, for example during catalyst filling or during transportation.

The present methods and catalyst carriers may usefully be used for a wide range of processes. Examples of suitable uses include processes and reactors for exothermic reactions such as reactions for the production of methanol, reactions for the production of ammonia, methanation reactions, shift reactions, oxidation reactions such as the formation of maleic anhydride and ethylene oxide reactions and the like. A particularly preferred use is in processes and reactors for performing the Fischer-Tropsch reaction.

Endothermic reactions such as pre-reforming, dehydrogenation and the like may also be carried out in conjunction with the present methods and catalyst carriers.

The catalyst carriers of the present disclosure may be filled or partially filled with any catalyst suitable for the intended reaction. For example, a Fischer-Tropsch catalyst may be used for the Fischer-Tropsch reaction. Cobalt-containing Fischer-Tropsch catalysts are preferred. The catalyst may be provided as catalyst particles or a catalyst monolith. The catalyst may be provided as a single bed of catalyst or multiple beds of catalyst. The catalyst carrier may be configured to promote axial and/or radial flow through the catalyst.

In some embodiments the catalyst carrier may be configured to preferentially promote radial flow through the catalyst.

The catalyst carrier of the present disclosure may be formed of any suitable material. Such material will generally be selected to withstand the operating conditions of the tubular reactor. The catalyst carrier may be fabricated from carbon steel, aluminium, stainless steel, other alloys or any material able to withstand the reaction conditions.

BRIEF DESCRIPTION OF THE DRAWINGS

Embodiments of the present disclosure will now be described, by way of example only, with reference to the accompanying drawings, in which.

DETAILED DESCRIPTION

Figure 1:
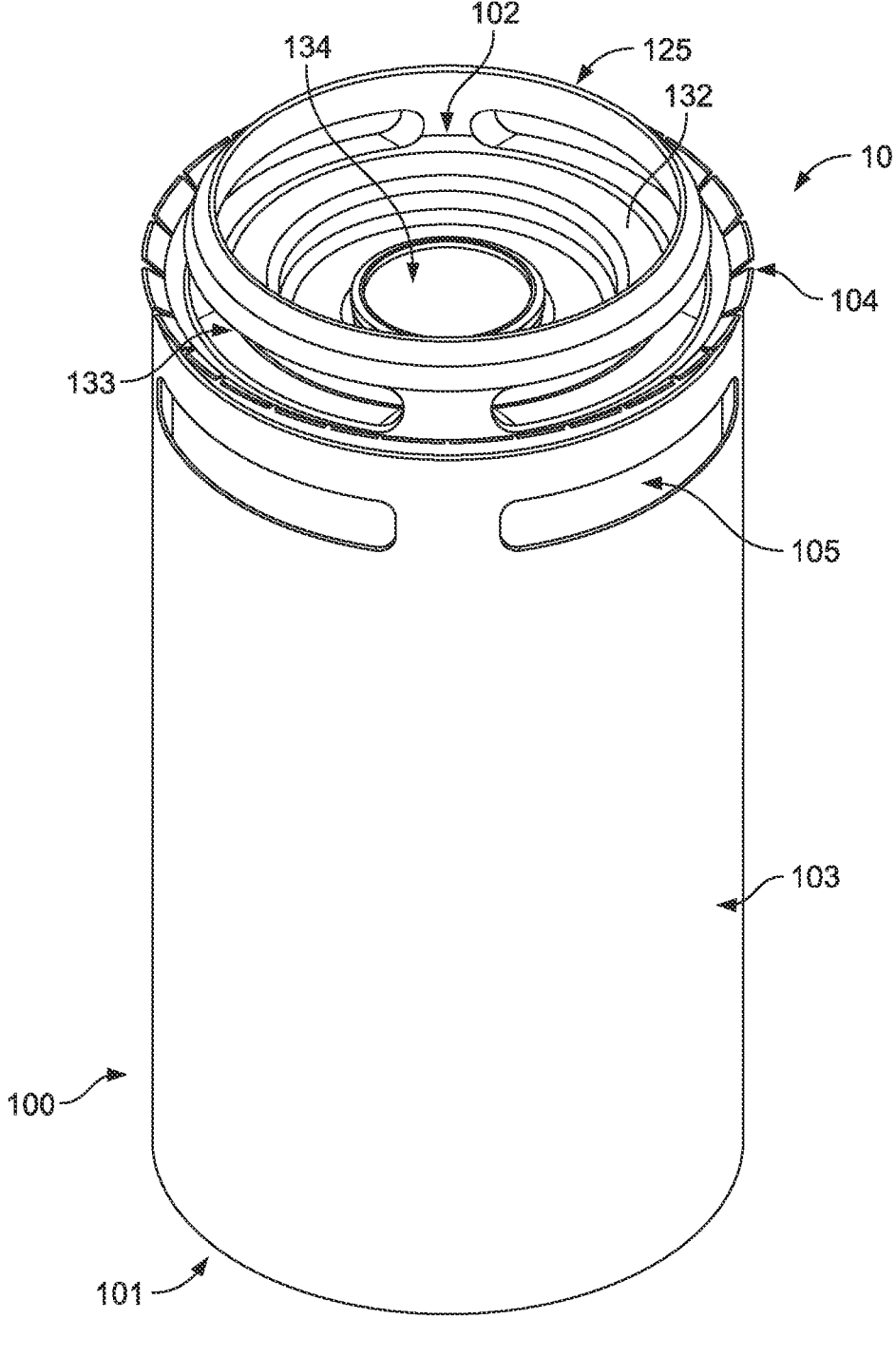
FIG. 1 is a perspective view of a catalyst carrier.

In the following, aspects and embodiments of the present disclosure will be described, by way of example only, with reference to example configurations of catalyst carrier. However, it will be understood that according to the present disclosure the catalyst carriers may take various general forms. For example, as well as the examples described herein the catalyst carriers 10 may take other general forms including but not limited to those disclosed in WO2011/048361, WO2012/136971 and WO2016/050520, the contents of which are herein incorporated by reference in their entirety.

Additionally, in this specification any reference to orientation, for example terms such as top, bottom, upper, lower, above, below and the like have, is used with regard to the orientation of the parts as illustrated in the drawings being referenced but is not to be seen as restrictive on the potential orientation of such parts in actual use. For example, a part described as being orientated vertically may also be orientated horizontally.

Figure 2:
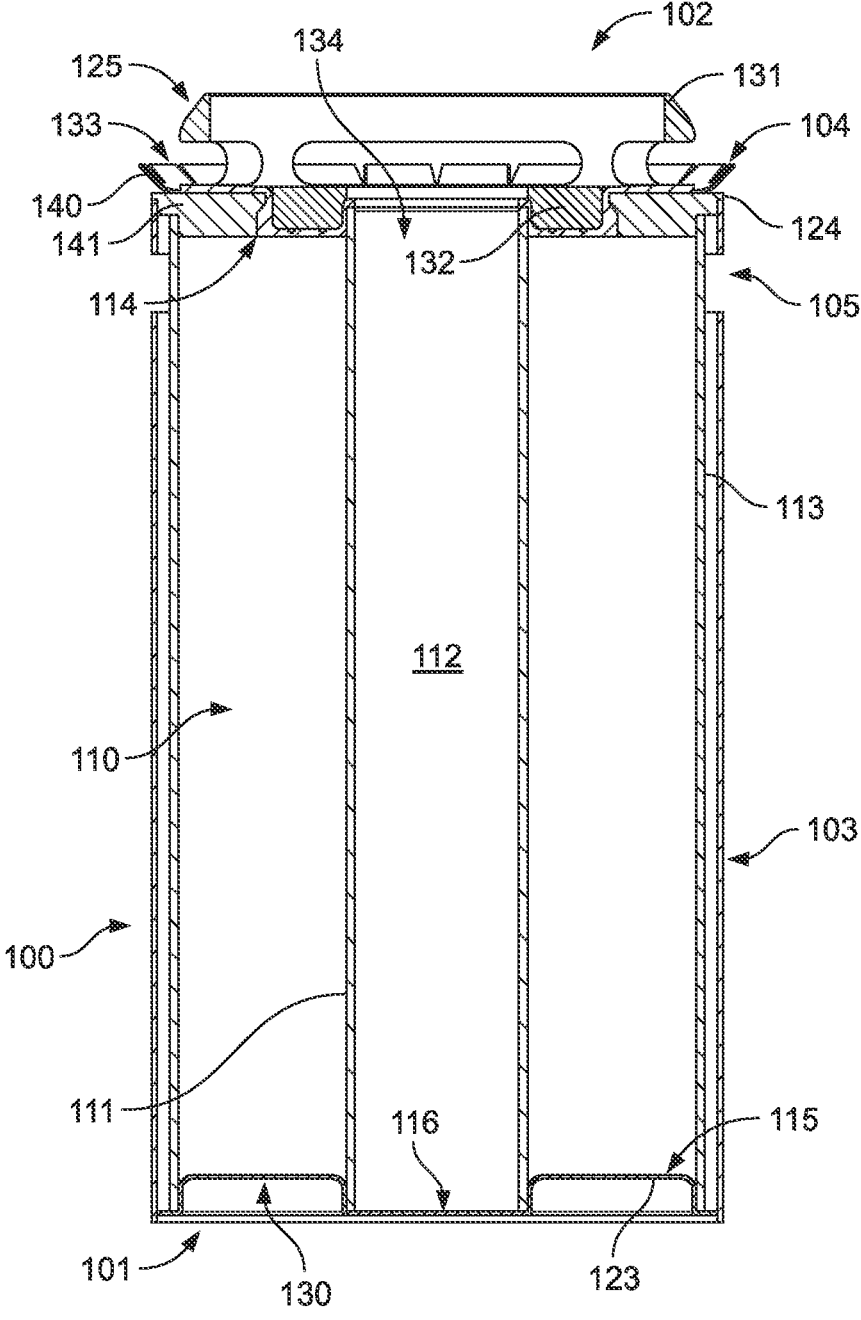
FIG. 2 is a cross-sectional view of the catalyst carrier of FIG. 1.
Figure 3:
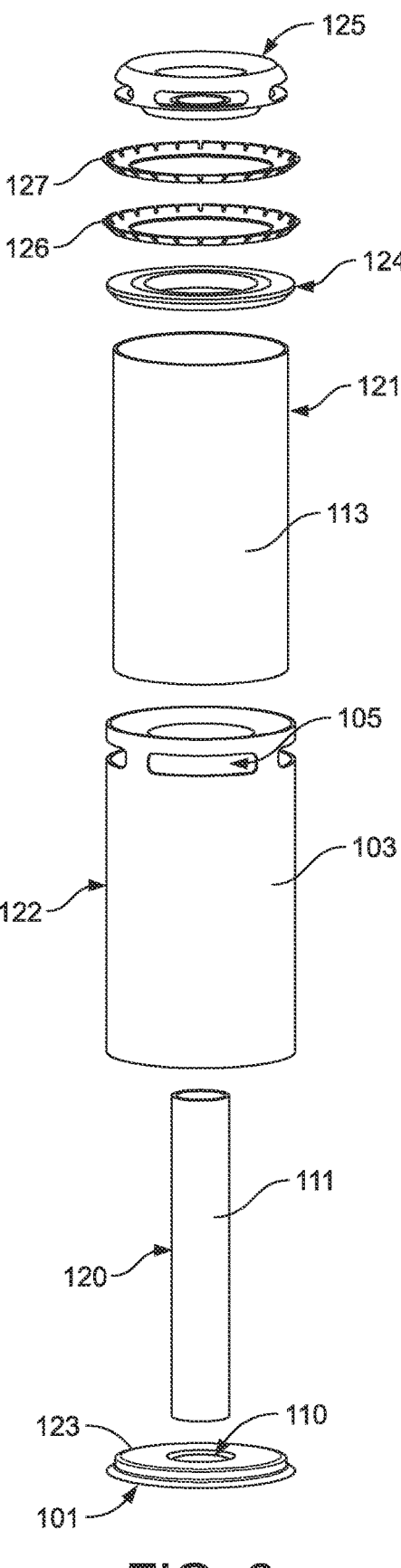
FIG. 3 is an exploded perspective view of the catalyst carrier of FIG. 1.

An example of a catalyst carrier 10 according to the present disclosure is shown, by way of example, in FIGS. 1 to 3.

The catalyst carrier 10 may generally comprise a container that is sized such that it is of a smaller dimension than the internal dimension of a reactor tube into which it is to be placed in use. Typically, a seal will be provided (discussed further below) that is sized such that it interacts with the inner wall of the reactor tube when the catalyst carrier 10 is in position within the reactor tube. Parameters such as carrier length and diameter may be selected to accommodate different reactions and configurations of reactor tube.

As shown in FIGS. 1 to 3, the catalyst carrier 10 may comprise a container 100 for holding particles of catalyst in use. The container 100 may generally have a bottom surface 101 that closes a lower end of the container 100 and a top surface 102 at an upper end of the container 100. A carrier outer wall 103 may extend from the bottom surface 101 to the top surface 102. A seal 104 may extend from the container 100 by a distance which extends beyond the carrier outer wall 103. The carrier outer wall 103 may have apertures 105 located below the seal 104.

As shown in FIG. 2, in at least some embodiments the catalyst carrier 10 may more particularly comprise an annular container 110 for holding catalyst in use. The annular container 110 may comprise a perforated inner container wall 111 that defines an inner channel 112 and a perforated outer container wall 113 that may be concentrically arranged about the perforated inner container wall 111. An annular top surface 114 may close an upper end of the annular container 110 and an annular bottom surface 115 may close a lower end of the annular container 110. A lower end of the inner channel 112 may be closed off by a channel end surface 116 except for one or more drain apertures (not shown) that may be provided in the lower end of the inner channel 112. The channel end surface 116 may be formed integrally or separately to the inner container wall 111.

As shown in the exploded view of FIG. 3, the catalyst carrier 10 may be formed from a number of individual components that may be assembled together by any suitable means, including for example welding. In some embodiments such components may include a perforated inner tube 120, a perforated intermediate tube 121, an outer tube 122, a bottom cap 123, an annular top ring 124, a top cap 125 and one or more annular seal layers 126, 127.

The catalyst carrier 10 may be formed of any suitable material. Such material will generally be selected to withstand the operating conditions of the reactor. Generally, the catalyst carrier will be fabricated from carbon steel, aluminium, stainless steel, other alloys or any material able to withstand the reaction conditions.

Suitable thicknesses for the components (other than the annular seal layers 126, 127) will be of the order of about 0.1 mm to about 1.0 mm, preferably of the order of about 0.3 mm to about 1.0 mm.

The perforated inner tube 120 may comprise the perforated inner container wall 111. The perforated intermediate tube 121 may comprise the perforated outer container wall 113. The outer tube 122 may comprise the carrier outer wall 103 and define the apertures 105. The bottom cap 123 may comprise the bottom surface 101 and or the annular bottom surface 115. The bottom cap 123 may also extend across the perforated inner tube 120 to comprise the channel end surface 116. The annular top ring 124 and the top cap 125 may comprise the annular top surface 114 and may comprise at least part of the top surface 102.

The size of the perforations in the perforated inner tube 120 and the perforated intermediate tube 121 will be selected such as to allow uniform flow of reactant(s) and product(s) through the catalyst while maintaining the catalyst within the annular container 110. It will therefore be understood that their size will depend on the size of the catalyst particles being used. In an alternative arrangement the perforations may be sized such that they are larger but have a filter mesh covering the perforations to ensure catalyst is maintained within the annular container 110.

It will be understood that the perforations may be of any suitable configuration. Indeed, where a wall or tube is described as perforated all that is required is that there is means to allow the reactants and products to pass through the walls or tubes.

The seal 104 may comprise at least a first seal layer 126 and a second seal layer 127. The seal 104 may comprise more than two seal layers 126, 127. For example, it may comprise four, five or six seal layers.

Figure 4:
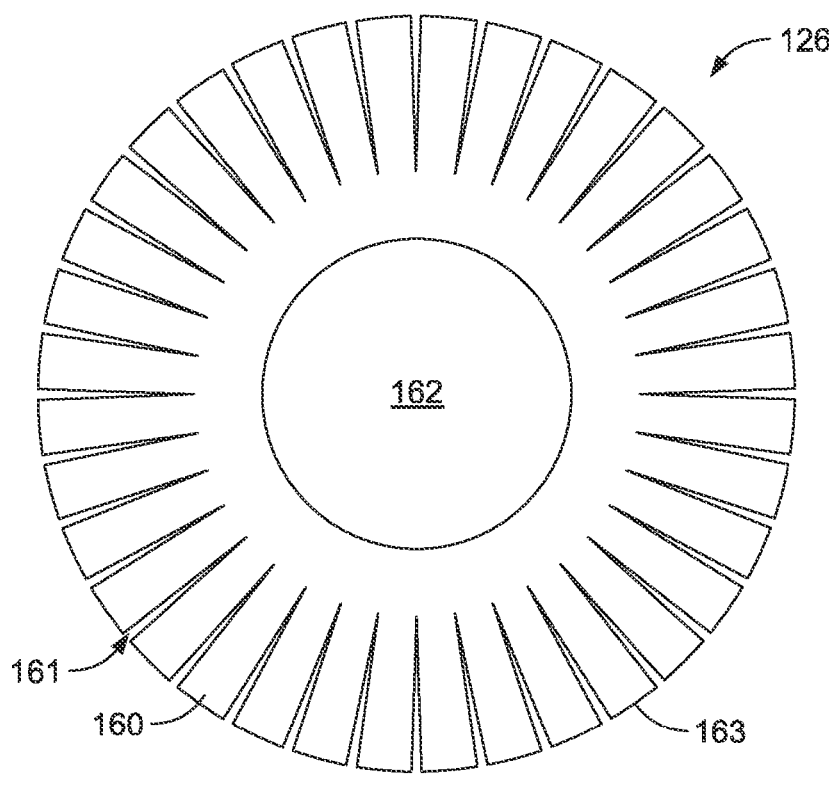
FIG. 4 is a plan view of a seal layer for a catalyst carrier.
Figure 5:
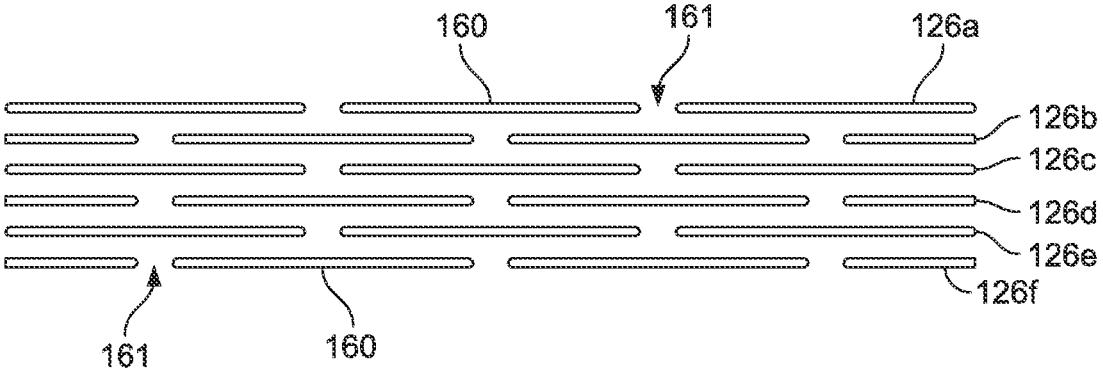
FIG. 5 is a schematic side view showing an arrangement of a plurality of seal layers.
Figure 6:
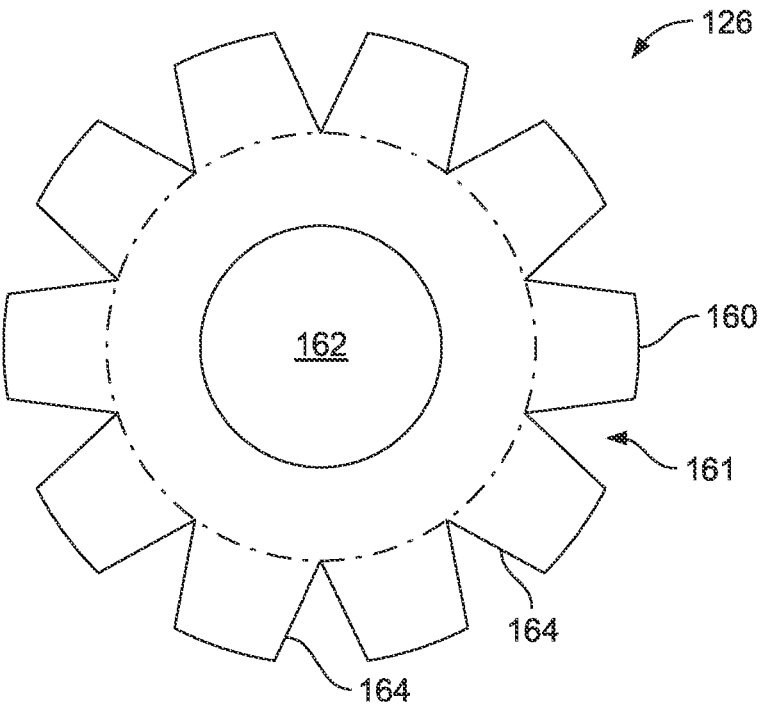
FIG. 6 is a plan view of first and second seal layers for a catalyst carrier.
Figure 6:
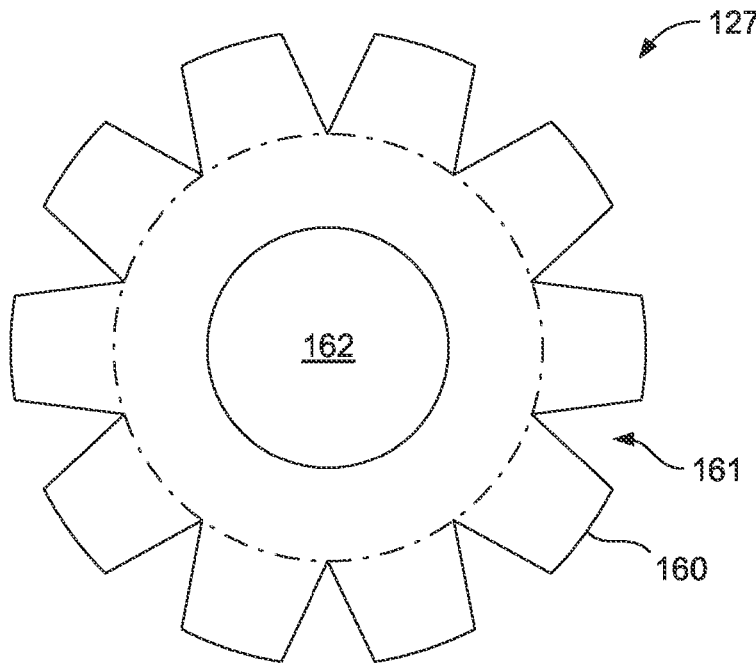

FIG. 4 illustrates an example of one seal layer 126. FIG. 5 illustrates how a plurality of seal layers 126a to 126f may be provided to form the seal 104. FIG. 6 illustrates another example of seal 104 formed from two seal layers 126, 127.

The seal layers 126, 127 may comprise portions of an integral sealing element, for example a helical element. Alternatively, and as illustrated in FIGS. 4 to 6, each seal layer 126, 127 may comprise a separate sealing element.

The first seal layer 126 and the second seal layer 127 overlie each other. Preferably, the layers 126, 127 are in face-to-face contact.

Each seal layer 126, 127 may comprise a separate seal ring.

Each seal layer 126, 127 may be flexible.

Each seal layer 126, 127 may comprise an annular element. An outer edge of each annular element may generally be configured to match the shape of the inner surface of the reactor tube.

The annular element may be circular. In some examples the outer diameter may be from 80 to 90 mm, optionally about 85 mm. The annular element may have a central aperture 162 for receiving the container of the catalyst carrier 10. The central aperture 162 may have a diameter from 55 to 65 mm, optionally about 60 mm.

The outer diameter may be chosen to achieve a desired insertion force of the catalyst carrier 10 taking into account the inner diameter of the reactor tube in which the catalyst carrier 10 is to be installed. Preferably an insertion resistance of more than the weight of the catalyst carrier containing catalyst and less than 100 N is desired.

Each seal layer 126, 127 comprises a plurality of deflectable tongues 160 separated by notches 161. Thus, each of the first seal layer 126 and the second seal layer 127 (and any additional seal layers) may comprise a notched outer edge 163.

Each seal layer 126, 127 may comprise from 5 to 80 deflectable tongues 160, optionally from 8 to 60 deflectable tongues 160, optionally about 40 deflectable tongues 160.

Each pair of deflectable tongues 160 may be separated by one notch 161.

Each seal layer 126, 127 may be formed from a single piece of sheet material. The notched outer edge 163 may be formed by a suitable means such as cutting, stamping, etc.

The material of each seal layer 126, 127 may be the same or may be different. Each seal layer 126, 127 may be formed from carbon steel, aluminium, stainless steel, other alloys or any material able to withstand the reaction conditions.

The thickness of each seal layer 126, 127 may be the same or may be different. Different thicknesses may be used to configure different seal layers with different characteristics, including, for example, flexibility, stiffness, compressibility, etc. Each seal layer 126, 127 may have a thickness that is selected to achieve the required insertion force and flexibility of the deflectable tongues 160. In some examples the thickness of each seal layer 126, 127 may be from 15 micron to 500 microns (0.015 mm to 0.5 mm).

The notches 161 may vary in width from relatively narrow, as in the example of FIGS. 4, to relatively wide, as in the example of FIG. 6.

The notches 161 may comprise side walls 164 (as most clearly seen in FIG. 6) that are parallel or diverge towards an outer edge of the respective seal layer 126, 127. The notches 161 may be U-shaped or V-shaped.

The second seal layer 127 is preferably rotationally offset about the longitudinal axis of the catalyst carrier 10 relative to the first seal layer 126 such that the notches 161 of the second seal layer 127 are aligned with the deflectable tongues 160 of the first seal layer 126.

The first seal layer 126 and the second seal layer 127 may extend perpendicularly from the container 100. Alternatively, the first seal layer 126 and the second seal layer 127 may be angled towards an upper end of the container 100, e.g. towards the top surface 102.

In some embodiments, the catalyst carrier 10 may comprise three or more seal layers 126, 127 each comprising a plurality of deflectable tongues 160 separated by notches 161. Each seal layer 126, 127 may be rotationally offset about the longitudinal axis of the catalyst carrier 10 relative to at least one of the other seal layers 126, 127 such that the notches 161 of each seal layer 126, 127 may be aligned with the deflectable tongues 160 of at least one of the other seal layers 126, 127. Preferably the notches 161 of each seal layer 126, 127 may be aligned with the deflectable tongues 160 of one or both adjacent seal layers 126, 127. For example, as illustrated in FIG. 5, the notches 161 of seal layer 126c are aligned with the deflectable tongues 160 of both seal layers 126b and 126d.

An inner edge of the seal layers 126, 127 may be attached together. The attachment may be created before or after the seal layers 126, 127 are attached to the container 100, for example by welding.

Each seal layer 126, 127 may comprise a key or keyway (not shown) for engaging a complementary keyway or key on the container 100 for maintaining relative rotational alignment of the seal layers 126, 127 with each other.

An inner portion of each seal layer 126, 127 may define a clamping surface that is sandwiched and retained between the top cap 125 and the annular top ring 124.

Returning to FIGS. 1 to 3, the bottom surface 101, for example the bottom cap 123, may be shaped to engage with an upper end of another catalyst carrier 10. For example, the bottom surface 101 may comprise an annular recess 130 around the perforated inner tube 120. The top cap 125 may be shaped to engage in the annular recess 130 of another catalyst carrier 10. For example, the top cap 125 may comprise an annular ring 131 that upstands from an annular plug body 132. The annular ring 131 may be shaped and sized to be received in the annular recess 130.

The bottom surface 101, for example the bottom cap 123 and or channel end surface 116, may include one or more drain holes. Where one or more drain holes are present, they may be covered by a filter mesh.

The annular top ring 124 may be shaped and sized to engage in an upper end of the outer tube 122. The annular plug body 132 of the top cap 125 may have an outer diameter configured to engage with a central aperture of the annular top ring 124. Engagement of the top cap 125 with the annular top ring 124 may function to sandwich and retain the seal layers 126, 127 of the seal 104 in position.

The top cap 125 may comprise a central inlet 134 in the annular plug body 132 for enabling entry of liquids and gases into the upper end of the inner channel 112. The annular ring 131 may comprise lateral apertures 133 than enable liquids and gases to reach the central inlet 134.

The top cap 125 and annular top ring 124 may together comprise a lid of the catalyst carrier 10 that may be used to close off the upper end of the annular container 110. Alternatively, the lid formed from a single component may be used.

The carrier outer wall 103 may be smooth or it may be shaped. Suitable shapes include pleats, corrugations, and the like.

The apertures 105 in the carrier outer wall 103 may be of any configuration. In some embodiments, the apertures 105 may be holes or slots.

The carrier outer wall 103 may continue above the seal 104. Thus the seal 104 may be located at the top of the catalyst carrier 10, optionally as part of the top surface 102, or it may be located at a suitable point on the carrier outer wall 103 provided that it is located above the apertures 105 in the carrier outer wall 103.

In use, the catalyst carrier 10 may be installed in a reactor tube by any suitable means. The catalyst carrier 10 may be pushed into the reactor tube using a movable ram. During insertion the seal 104 of the catalyst carrier 10 will contact an inner surface of the reactor tube and be deformed. In particular, pushing the catalyst carrier 10 into the reactor tube will cause the first seal layer 126 and the second seal layer 127 of the seal 104 to be deflected into contact with one another as they are engaged by the inner surface of the reactor tube.

Deformation of the first seal layer 126 and the second seal layer 127 may cause the notches 161 of one or both layers to at least partially close. Preferably, the plurality of deflectable tongues 160 of at least one of the first seal layer 126 and the second seal layer 127 at least partially seal off the notches 161 of the other of the first seal layer 126 and the second seal layer 127.

The seal 104 may provide a resistance to insertion of greater than the weight of the catalyst carrier containing catalyst and less than 100 N.

The invention claimed is:

1. A catalyst carrier for insertion into a reactor tube of a tubular reactor, the catalyst carrier comprising a container for holding catalyst in use and a seal for sealing between the container and an inner surface of the reactor tube;

the catalyst carrier having a longitudinal axis that in use can be aligned with a longitudinal axis of the reactor tube to facilitate installation of the catalyst carrier into the reactor tube;

wherein the seal comprises at least a first seal layer and a second seal layer;

the first seal layer and the second seal layer each comprising a plurality of deflectable tongues separated by notches;

the second seal layer being rotationally offset about the longitudinal axis of the catalyst carrier relative to the first seal layer such that the notches of the second seal layer are aligned with the deflectable tongues of the first seal layer, wherein each seal layer comprises a key or keyway for engaging a complementary keyway or key on the container for maintaining relative rotational alignment of the seal layers with each other.

2. The catalyst carrier of claim 1, wherein the first seal layer and the second seal layer overlie each other; optionally in face-to-face contact.

3. The catalyst carrier of claim 1, wherein the first seal layer and the second seal layer comprise separate sealing elements.

4. The catalyst carrier of claim 1, wherein the first seal layer and the second seal layer comprise first and second portions of an integral sealing element; and optionally wherein the integral sealing element is a helical element.

5. The catalyst carrier of claim 1, wherein each of the first seal layer and the second seal layer comprise a notched outer edge forming its plurality of deflectable tongues.

6. The catalyst carrier of claim 1, wherein the notches comprise side walls that are parallel or diverge towards an outer edge of the respective seal layer; and optionally wherein the notches are U-shaped or V-shaped.

7. The catalyst carrier of claim 1, wherein the first seal layer and the second seal layer extend perpendicularly from the container.

8. The catalyst carrier of claim 1, wherein at least a distal end of the tongues of the first seal layer and the second seal layer are angled towards an end of the container.

9. The catalyst carrier of claim 1, wherein each of the first seal layer and the second seal layer comprise an annular element.

10. The catalyst carrier of claim 1, comprising three or more seal layers each comprising a plurality of deflectable tongues separated by notches; each seal layer being rotationally offset about the longitudinal axis of the catalyst carrier relative to at least one of the other seal layers such that the notches of each seal layer are aligned with the deflectable tongues of at least one of the other seal layers; and optionally wherein the notches of each seal layer are aligned with the deflectable tongues of one or both adjacent seal layers.

11. The catalyst carrier of claim 10, wherein the catalyst carrier comprises four, five or six seal layers.

12. The catalyst carrier of claim 1, wherein an inner edge of the one or more seal layers are attached together.

13. The catalyst carrier of claim 1, wherein each container comprises a bottom surface at the lower end, a top surface at the upper end, and a carrier outer wall extending between the bottom surface to the top surface.

14. The catalyst carrier of claim 13, wherein the seal layers are attached to the carrier outer wall and or the top surface.

15. The catalyst carrier of claim 1, wherein the carrier outer wall comprises a plurality of apertures and the seal layers are attached to the carrier wall above the plurality of apertures.

16. The catalyst carrier of claim 1, wherein each container further comprises an annular chamber for holding catalyst in use, said annular chamber having a perforated inner chamber wall defining an inner channel, a perforated outer chamber wall, a top surface closing the annular chamber and a bottom surface closing the annular chamber.

17. The catalyst carrier of claim 1, wherein the thickness of the first seal layer and the second seal layer are different.

18. The catalyst carrier of claim 1, wherein the material of the first seal layer and the second seal layer are different.

19. The catalyst carrier of claim 1, wherein the shape of the notches of the first seal layer and the second seal layer are different.

20. A method of installing a catalyst carrier into a reactor tube of a tubular reactor, the method comprising the steps of:

i) providing an installation tool comprising a movable ram configured for pushing the catalyst carrier into the reactor tube;

ii) using the movable ram to push the catalyst carrier into the reactor tube such that a container of the catalyst carrier is received within the reactor tube; and iii) pushing the catalyst carrier into the reactor tube causes a seal of the catalyst carrier to contact and be deformed by an inner surface of the reactor tube and at least a first seal layer and a second seal layer of the seal are deformed by the contact of the seal with the inner surface, wherein each seal layer comprises a key or keyway for engaging a complementary keyway or key on the container for maintaining relative rotational alignment of the seal layers with each other.

21. The method of claim 20, wherein the first seal layer and the second seal layer both comprise a plurality of notches and pushing the catalyst carrier into the reactor tube causes the notches to at least partially close.

22. The method of claim 20, wherein the first seal layer and the second seal layer both comprise a plurality of deflectable tongues separated by notches and pushing the catalyst carrier into the reactor tube causes the plurality of deflectable tongues of one of the first seal layer and the second seal layer to at least partially seal off the notches of the other of the first seal layer and the second seal layer.

23. The method of claim 20, wherein the seal provides a resistance to insertion of greater than the weight of the catalyst carrier containing catalyst and less than 100 N.

\*    \*    \*    \*    \*